United States Patent
Naka et al.

(10) Patent No.: US 6,721,621 B1
(45) Date of Patent: Apr. 13, 2004

(54) NUMERICAL CONTROLLER FOR WIRE ELECTRICAL DISCHARGE MACHINE

(75) Inventors: Shigeaki Naka, Tokyo (JP); Toru Inoue, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/462,672

(22) PCT Filed: Mar. 18, 1999

(86) PCT No.: PCT/JP99/01330
§ 371 (c)(1),
(2), (4) Date: Oct. 18, 2002

(87) PCT Pub. No.: WO99/48032
PCT Pub. Date: Sep. 23, 1999

(30) Foreign Application Priority Data

May 13, 1998 (JP) .......................................... 10-130395

(51) Int. Cl.$^7$ .............................. G06F 19/00; B23H 1/02
(52) U.S. Cl. ...................... 700/162; 700/174; 700/180; 219/69.11
(58) Field of Search .............................. 700/159, 160, 700/162, 169, 172, 174, 180, 184; 219/68, 69.1, 69.11, 69.16

(56) References Cited

U.S. PATENT DOCUMENTS

| | | | | |
|---|---|---|---|---|
| 4,005,303 A | * | 1/1977 | Inoue | 219/69.13 |
| 4,045,641 A | * | 8/1977 | Ullmann et al. | 219/69.13 |
| 5,323,325 A | * | 6/1994 | Izumiya | 700/174 |
| 5,637,240 A | * | 6/1997 | Izumiya et al. | 219/69.13 |
| 5,793,947 A | * | 8/1998 | Sakamoto | 700/161 |
| 5,822,212 A | * | 10/1998 | Tanaka et al. | 700/174 |
| 6,549,824 B1 | * | 4/2003 | Satou et al. | 700/162 |

FOREIGN PATENT DOCUMENTS

| | | |
|---|---|---|
| JP | 3-233705 | 10/1991 |
| JP | 4-269119 | 9/1992 |
| JP | 6-8054 | 1/1994 |
| JP | 6-99313 | 4/1994 |

OTHER PUBLICATIONS

International Search Report PCT/JP99/01330.

* cited by examiner

Primary Examiner—Leo Picard
Assistant Examiner—Paul Rodriguez
(74) Attorney, Agent, or Firm—Sughrue Mion, PLLC (57) ABSTRACT

In wire electrical discharge machining, to make it possible to determine the state of rough machining or finishing in various stages, the machining speed, the working voltage, and execution portion information are stored as a set for each movement of a fixed distance in the process of execution of a plurality of times of machining in which rough machining through finish machining are consecutively executed, and are displayed in a two-dimensional graph.

4 Claims, 6 Drawing Sheets

FIG. 2

MACHINING-STATE DETECTION INFORMATION

| VOLTAGE | MACHINING SPEED | SEQUENCE NUMBER | BLOCK NUMBER | CUMULATIVE DISTANCE OF MOVEMENT | STARTING HOLE NUMBER | NUMBER OF FINISHING |
|---|---|---|---|---|---|---|
| 35.4 | 1.96 | L2022 | N30 | 3.118 | 3 | 1 |
| 34.5 | 1.54 | L2022 | N30 | 3.156 | 3 | 1 |
| 37.6 | 0.87 | L2022 | N30 | 3.225 | 3 | 1 |
| 37.8 | 1.22 | L2022 | N30 | 3.299 | 3 | 1 |

NUMERICAL CONTROLLER FOR WIRE ELECTRICAL DISCHARGE MACHINE

TECHNICAL FIELD

The present invention relates to a numerical controller for displaying a state of machining of a wire electrical discharge machine.

BACKGROUND ART

In a wire electrical discharge machine, a wire electrode is disposed at a predetermined interval with respect to a workpiece, the workpiece and the wire electrode are immersed in a processing tank, and a voltage is applied between the workpiece and the wire electrode in this state.

The wire electrode and the workpiece are brought close to each other, and when the amount of the gap between the wire electrode and the workpiece reaches a predetermined amount, electrical discharge takes place between the wire electrode and the workpiece. As a result, the workpiece is machined by this electrical discharge energy.

In such wire electrical discharge machining, it is necessary to maintain the amount of the gap between the wire electrode and the workpiece to an optimum amount so as to constantly maintain an optimum state of electrical discharge. However, as the workpiece is machined, the amount of the gap constantly changes, and debris is produced between the electrodes, so that it is difficult to directly measure the amount of the gap.

On the other hand, in wire electrical discharge machining, a substantially linear relationship holds between the amount of the gap between the wire electrode and the workpiece and a mean working voltage obtained by smoothing the working voltage, and to maintain the mean working voltage to a fixed level is equivalent to holding the amount of the gap to a fixed amount. Accordingly, it becomes necessary to maintain the mean working voltage to a fixed level by controlling the machining speed or the position of the wire electrode.

As described above, in wire electrical discharge machining, a close relationship holds between the amount of the gap between the wire electrode and the workpiece on the one hand, and the machining speed and the working voltage on the other hand, and when analyzing the machining and determining whether it is good or bad, it is extremely important to use tendencies and movements of the machining speed and the working voltage as materials for their judgement.

Figure 7:
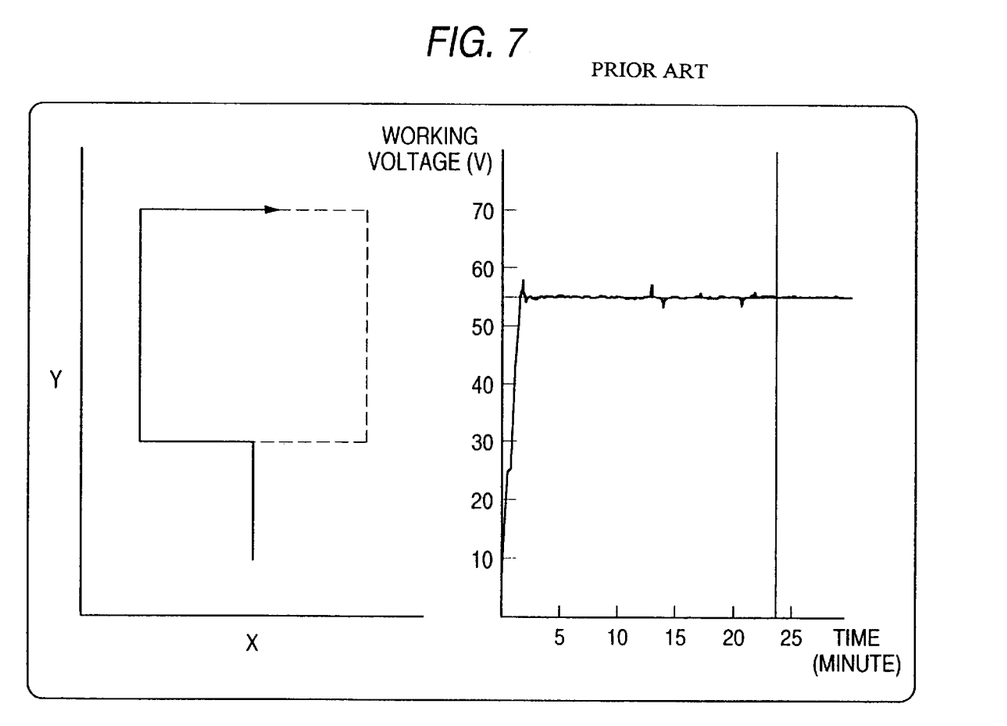
FIG. 7 is a diagram illustrating a display of a machining state in a conventional example.

As a conventional technique of this type, one disclosed in Japanese Patent Unexamined Publication No. 264215/1991 has been known. FIG. 7 is a diagram explaining a conventional example. In the left-hand portion of the drawing, a machining configuration based on a machining program is displayed in advance (broken-line portion), and the present position (thick-line portion) corresponding to the position of the wire electrode is displayed by being superposed thereon. In the right-hand portion of the drawing, the working voltage during machining and the time axis are graphically displayed as being the ordinate and the abscissa, respectively. Further, there is a disclosure wherein a portion of the machining configuration is selected and displayed in enlarged form, and the working voltage at the corresponding portion is displayed in enlarged form in interlocking relation to the enlarged display.

Figure 8:
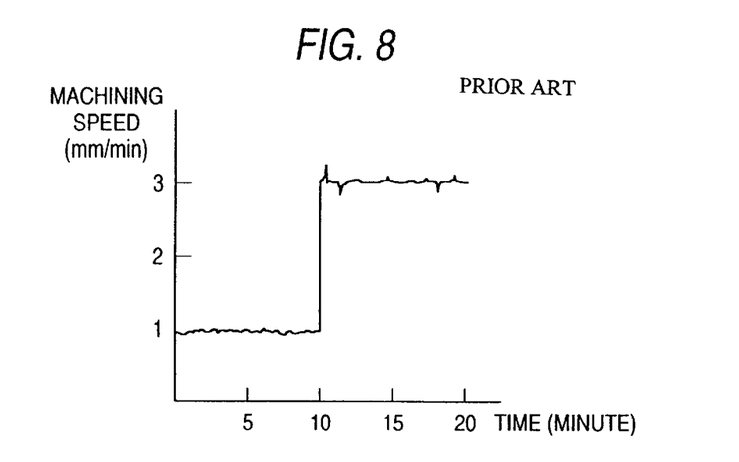
FIG. 8 is a diagram illustrating the relationship between a machining path and a machining speed in the conventional example.

FIG. 8 is a diagram illustrating the relationship between the lapse of the machining time and the machining speed in the conventional example. However, in a case where machining is effected a plurality of times ranging from rough machining to finish machining with respect to the same configuration, since the relationship between the machining speed and the voltage in the respective stages is overwritten, there is a problem in that it is impossible to determine such as whether machining in each stage is being effected appropriately, or at which stage of machining a problem exists.

DISCLOSURE OF THE INVENTION

The present invention has been devised to overcome the above-described drawbacks of the conventional art, and its object is to provide a numerical controller having a display means which compares and displays in one two-dimensional graph items of machining-state detection information on machining stages ranging from rough machining to a plurality of times of finish machining.

In a wire electrical discharge machine for producing electrical discharge between a wire electrode and a workpiece and finishing the workpiece a plurality of times from rough machining to finish machining on the basis of a predetermined machining program, a numerical controller for a wire electrical discharge machine in accordance with a first aspect of the present invention comprises:

machining controlling means for determining and controlling a machining speed of the wire electrode in accordance with a discharge gap between the workpiece and the wire electrode or a state of electrical discharge;

machining-state detecting means for detecting machining-state detection information such as a working voltage for each movement of a predetermined distance in a process of execution of machining based on the machining program;

information-record storing means for correlating detection information detected by the machining-state detecting means, the machining speed generated by the machining controlling means, and machining position information for each movement of the predetermined distance, and for storing them in a storage device as machining-state detection information records;

information-record reading means for reading the stored machining-state detection information records from the storage device; and two-dimensional graph displaying means for giving a graphic display by using the machining-state detection information and the machining speed, which are the machining-state detection information records thus read, as elements of one of two axes of a two-dimensional graph and by using the machining position information of the machining program as an element of the other axis thereof.

In a wire electrical discharge machine for producing electrical discharge between a wire electrode and a workpiece and machining the workpiece on the basis of a predetermined machining program, a numerical controller for a wire electrical discharge machine in accordance with a second aspect of the present invention comprises:

machining controlling means for determining and controlling a machining speed in accordance with a discharge gap between the workpiece and the wire electrode or a state of electrical discharge;

machining-state detecting means for detecting machining-state detection information such as a working voltage for each movement of a predetermined distance in a process of execution of machining based on the machining program;

information-record storing means for correlating detection information detected by the machining-state detecting means, the machining speed generated by the machining controlling means, machining position information for each movement of the predetermined distance, and at least one of a sequence number, a block number, a machining start hole number, and a number of finishing which are included in the machining program, and for storing them in a storage device as machining-state detection information records;

information-record reading means for reading the stored machining-state detection information records from the storage device; and display means for displaying a list of the machining-state detection information records thus read.

A numerical controller for a wire electrical discharge machine in accordance with a third aspect of the present invention, the machining position information is displayed by being correlated to blocks of the machining program.

Since the present invention is configured as described above, the present invention offers the following advantages.

In the numerical controller for a wire electrical discharge machine in accordance with the first aspect of the present invention, the machining-state detection information, the machining speed generated by the machining controlling means, and execution portion information of the machining program are formed as a set and are stored in the storage device as the machining-state detection information records, and the stored machining-state detection information records are read from the storage device and are displayed in a two-dimensional graph.

Accordingly, it is possible to detect and determine whether rough machining or finish machining in each stage is being effected appropriately, or in which machining a problem lies in a midpoint machining stage due to changes in the machining speed, the working voltage, and the like.

In the numerical controller for a wire electrical discharge machine in accordance with the second aspect of the present invention, the machining-state detection information, the machining speed, and the execution portion information for correspondence with an execution portion, as well as the sequence number and the block number of the machining program, a cumulative distance of movement from a machining start point, a machining start hole number, and the number of finishing, are displayed in list form. Accordingly, it is possible to detect and determine whether rough machining or finish machining in each stage is being effected appropriately, or which position in the machining program is a problem in machining.

In the numerical controller for a wire electrical discharge machine in accordance with the third aspect of the present invention, since a display is given by using as a reference the distance of movement a point of origin in each block of the machining program, it is possible to detect and determine whether rough machining or finish machining in each stage is being effected appropriately, or at which position of the block a problem has occurred.

BEST MODE FOR CARRYING OUT THE INVENTION

First Embodiment

Figure 1:
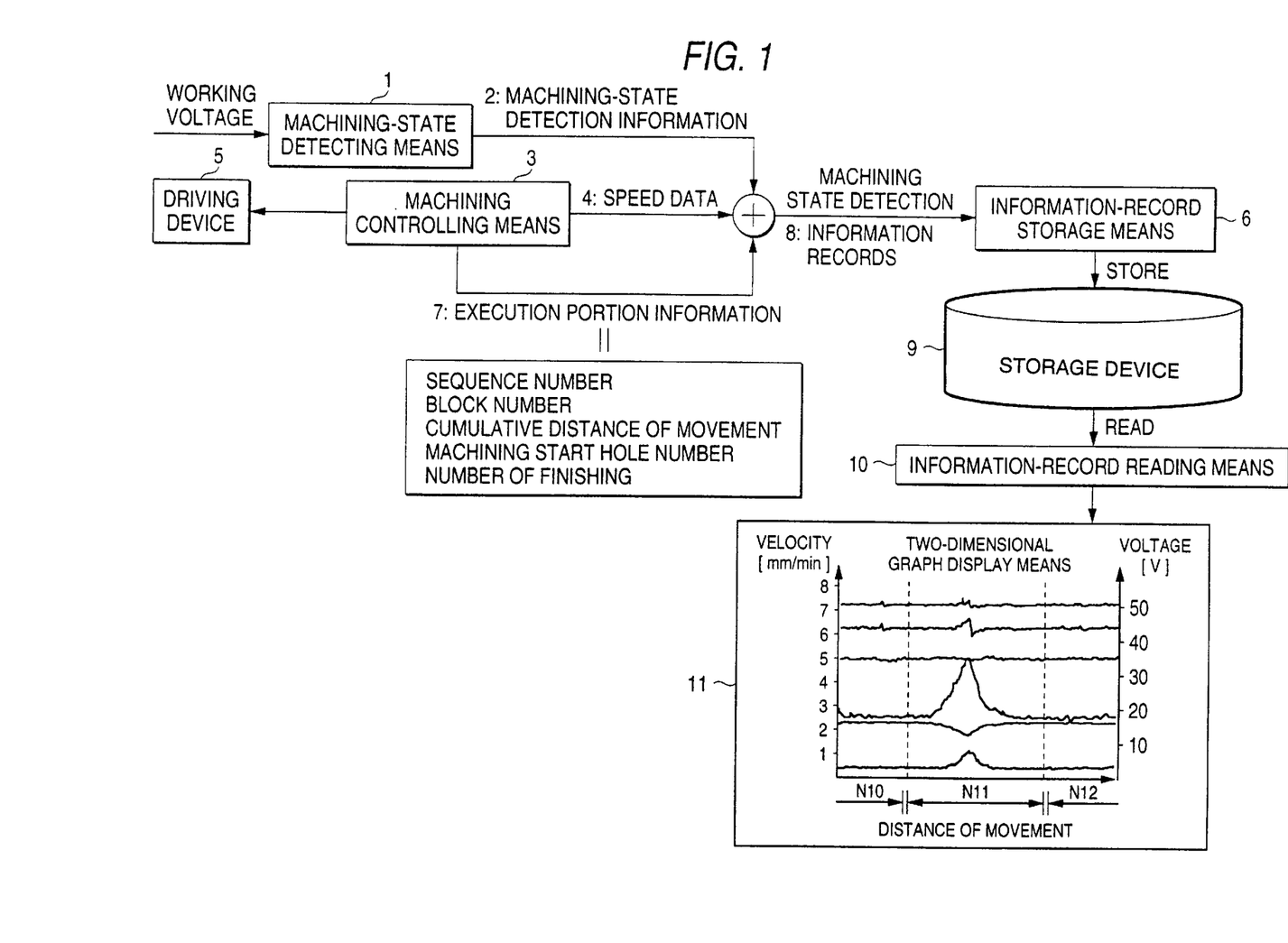
FIG. 1 is a diagram illustrating the configuration of the present invention.

Referring to the drawings, a description will be given of an embodiment of the present invention. FIG. 1 is a diagram illustrating the configuration of a portion of a numerical controller for a wire electrical discharge machine in accordance with the present invention.

Reference numeral 1 denotes a machining-state detecting means which detects the working voltage connected to a discharge circuit of the wire electrical discharge machine, and the numerical controller is capable of fetching the voltage during machining through this machining-state detecting means. In this case, the working voltage serves as machining-state detection information 2. It should be noted that it is also possible to jointly display other parameters of such as the working current, working reaction force, working fluid temperature, and ambient temperature as the machining-state detection information 2 other than the working voltage and fetch them into an information-record storage means 6 as machining-state detection information records 8.

Reference numeral 3 denotes a machining controlling means, which is a basic function of the numerical controller as is known. In the wire electrical discharge machine, the machining controlling means 3 controls the relative movement of the wire electrode and the workpiece so as to maintain the mean working voltage at a fixed level, as mentioned above. Machining speed data 4 generated by the machining controlling means 3 to maintain the mean working voltage at a fixed level is imparted to a driving device 5 for effecting the relative movement of the wire electrode and the workpiece. In addition, the machining speed data 4 is outputted from the machining controlling means 3 to the information-record storage means 6 as machining result data, i.e., as the machining-state detection information records 8.

The machining controlling means 3 further generates execution portion information 7 as well. As is known, machining based on the numerical controller is performed by consecutively interpreting and executing a machining program (NC program), and sequence numbers and block numbers are present for identifying blocks which are units of the machining program. Since these can be recognized by the machining controlling means 3 in the execution of the machining program, they can be outputted to the information-record storage means 6 as the machining-state detection information records 8. In addition, the cumulative distance of movement from a machining starting point can also be generated by the numerical controller by accumulating the moving distance data generated in the execution of the machining program, and can be imparted to the information-record storage means 6.

To compare and display the relationship between the machining speed and the voltage in the plurality of stages of machining ranging from rough machining to finish machining with respect to the same configuration, it is possible to additionally use machining start hole numbers and the number of finishing as the execution portion information 7 therefor. In a case where a plurality of machining start holes are provided in one workpiece, and machining of a plurality of configurations is effected, it becomes necessary to identify the machining portions, so that it is important to use the machining start hole numbers.

Although a method of instructing the machining start hole number is not set in the machining program, it is possible to use a variable of the machining program as a counter for counting the machining start hole, or allow the machining controlling means 3 to recognize the machining start hole number with an exclusive-use NC code allotted thereto.

As the machining-state detection information records 8, the information-record storage means 6 stores in a storage device 9 the working voltage which is the machining-state detection information 2 imparted from the machining-state detecting means 1, the machining speed data 4 imparted from the machining controlling means 3, and the sequence number, block number, cumulative distance of movement, machining start hole number, and number of finishing which are the execution portion information 7.

Figure 2:
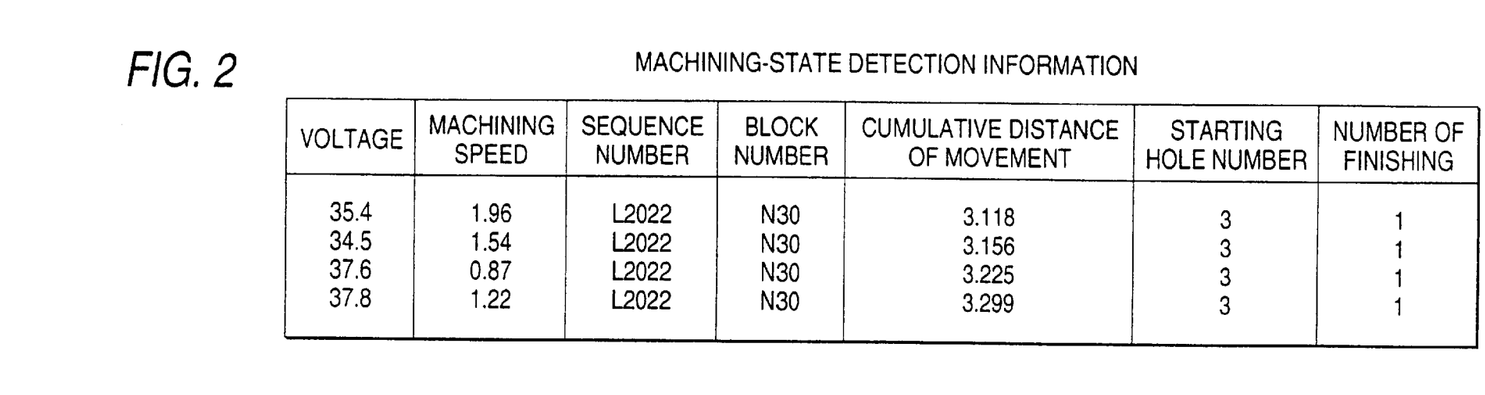
FIG. 2 is a diagram illustrating values and an example of display of machining-state detection information records stored in a storage device.

An example of the structure of the machining-state detection information records 8 is shown in FIG. 2. The working voltage which is the machining-state detection information 2, the machining speed data 4, and the sequence number, block number, cumulative distance of movement, machining start hole number, and number of finishing which are the execution portion information 7 are stored in the storage device 9 at predetermined detection intervals.

The generation and storage of the aforementioned set of machining-state detection information records 8 are executed for a predetermined detection interval or each movement of a fixed distance in the process of execution of rough machining alone or in the process of execution of a plurality of times of machining in which rough machining through finish machining are consecutively executed.

An information-record reading means 10 reads the machining-state detection information records 8 from the storage device 9, and imparts them to a two-dimensional graph display means 11.

Figure 3:
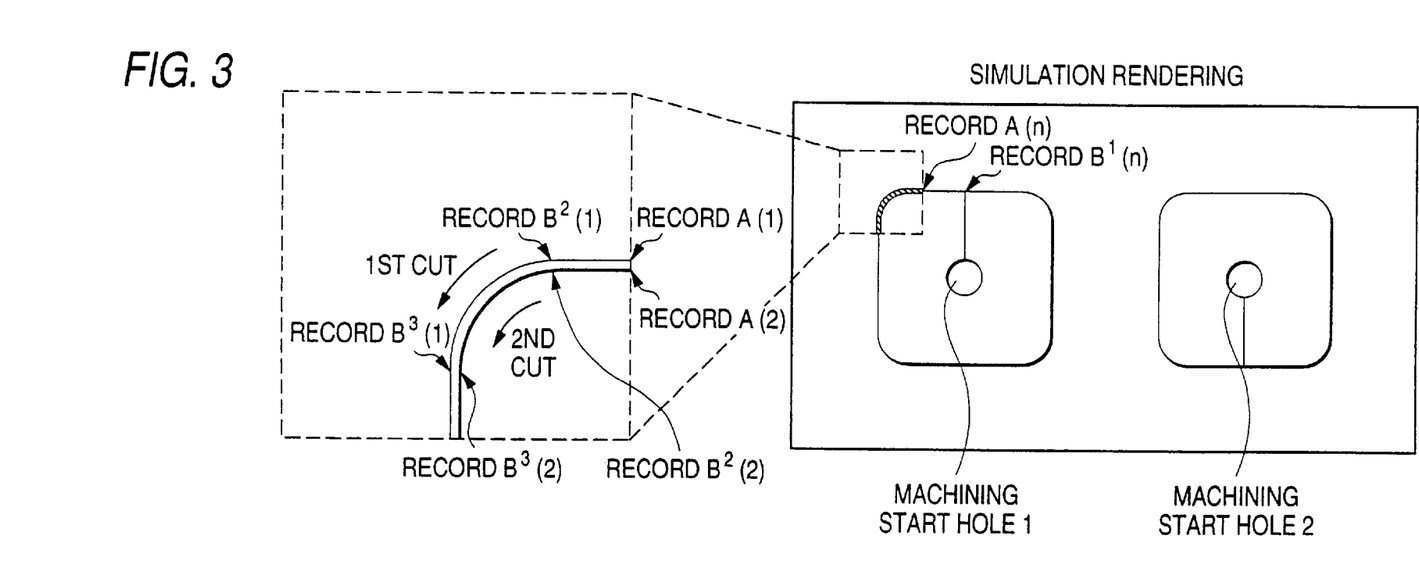
FIG. 3 is a diagram in which a portion of a machining program displayed by way of a graphic simulation is range-designated by a rectangle.
Figure 4:
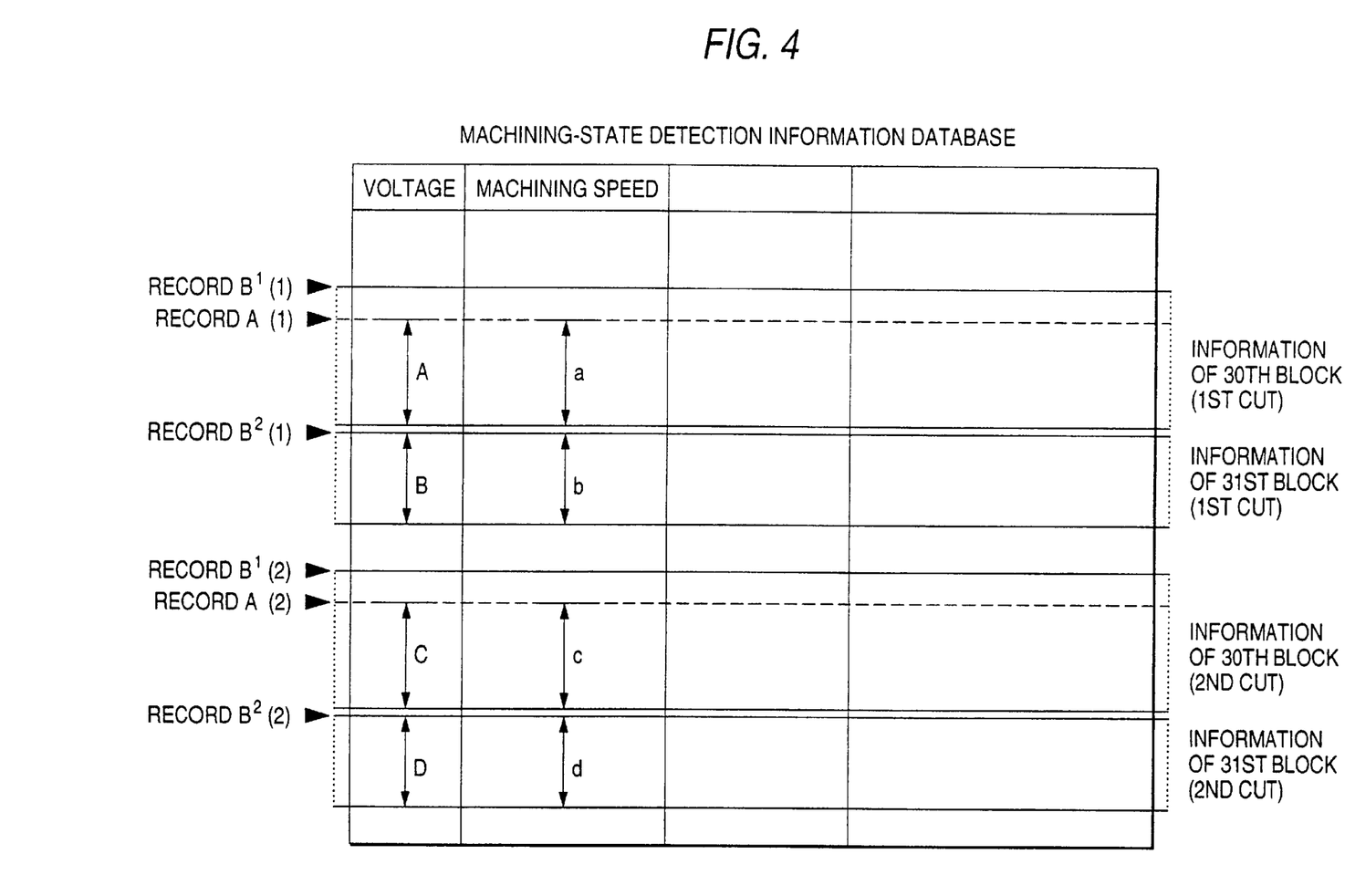
FIG. 4 is a diagram illustrating the distribution of the range-designated information among the machining-state detection information records.
Figure 5:
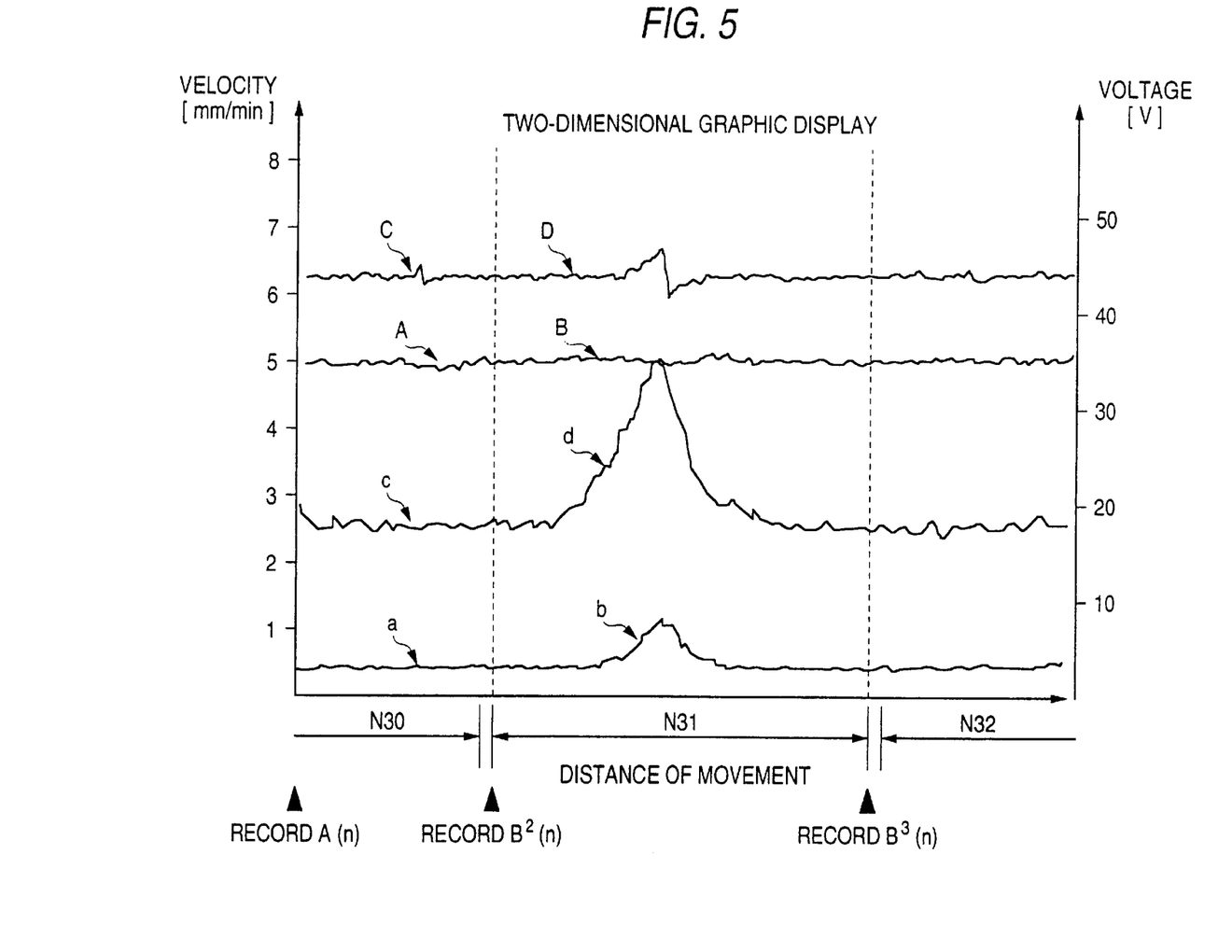
FIG. 5 is a diagram in which machining information of different numbers of machining are graphically represented by being superposed two-dimensionally.

Referring to FIGS. 3, 4 and 5, a description will be given below of the method in which the graph display means 11 compares and displays the relationship between the machining speed and the working voltage in the plurality of machining stages ranging from rough machining to finish machining with respect to the same configuration. It should be noted, however, that it is assumed that all the directions of machining paths of the respective stages ranging from rough machining to finish machining are identical.

Referring to FIG. 3, a description will be given of a step in which an operator designates a range through a rectangle for range designation on the screen so as to display the machining program used in machining by means of graphic simulation. In addition, FIG. 4 is a diagram illustrating the machining-state detection information records 8 stored in the storage device 9 by the information-record storage means 6.

Which rendering elements are included in the range-designated rectangle can be detected from the machining program by a known graphic representation technique. For example, whether or not rendering elements are included in the range-designated rectangle are consecutively determined in the process of rerendering the overall configuration.

If a determination is made that the rendering element is included, by means of an identification number allotted in advance to the rendering element it is possible to specify a relevant portion of the machining program, on which the generation of the relevant rendering element is based. This identification number may be a record number (corresponding to a row number in FIG. 4) in a case where the execution portion information 7 (sequence number, block number, cumulative distance of movement, machining start hole number, and number of finishing) generated in the process of the graphic simulation of the machining program is consecutively stored in a database.

Next, a description will be given of the step of extracting a corresponding portion in a plurality of times of machining.

To compare and display the relationship between the machining speed and the working voltage in the plurality of machining stages ranging from rough machining to finish machining, it is necessary to extract machining-state detection records corresponding to each stage. Generally, since machining is effected by controlling the position of the wire electrode by changing the offset value of the machining program having the same path when the workpiece is subjected to rough machining through finish machining, the respective distances of movement in the machining stages at an arcuate corner do not agree with each other. Accordingly, there are cases where only the cumulative distance of movement of the machining stages is insufficient to obtain correspondence with the machining stages.

On the other hand, the sequence number and the block number should become identical at each machining stage insofar as the same machining program is used by being invoked. Accordingly, it is possible to adopt a method in which a corresponding block is fist specified by the sequence number and the block number, and correspondence is then obtained by the cumulative distance of movement for each corresponding block.

A description will be given of the step of extracting a corresponding block.

Here, to simplify the description, it is assumed that rendering elements corresponding to a plurality of machining start holes are not included in the range-designated rectangle. Namely, it is assumed that the designation of the range is effected with respect to only one configuration as shown in the broken-line frame in the left half portion of FIG. 3.

Among the rendering elements which are included in the rectangle when a range is designated, a plurality of execution portion information records ranging from rough machining to finish machining are specified in mixed form. Here, a description will be given of a case where an execution portion information record in rough machining is used as a reference, and an execution portion of finish machining corresponding thereto is extracted.

As shown in the broken-line frame in the left half portion in FIG. 3, a first record which is rough machining (this is the case where the number-of-finishing data is 1, and is also called 1st cut) is searched for among the execution portion information records specified in the range designation. This is set as a record A(1). Incidentally, the numeral in the parentheses, which is an index of A, represents the number of machining. Next, among all the records, an initial record which is rough machining and has the same values as those of the sequence number and the block number of the record A(1) is searched for. This is set as a record B1(1). Subsequent records are represented as Bm(n) in which the numeral following B represents the block number (mth) in the designated range, and the subsequent numeral in the parentheses represents the number of machining (nth) ranging from rough machining to finish machining. Namely, the record B1(1) is the execution portion information record at the portion where the block of the machining program at the rough machining portion included in the range-designated rectangle starts. There are cases where B1(1) is not included in the range-designated rectangle as in the case of the solid-line frame in the right half portion in FIG. 3.

Further, if different blocks are included in the range-designated rectangle, such blocks are consecutively determined as records B2(1) and B3(1). Next, among all the records, an initial record whose number-of-machining data is 2 (called 2nd cut) and which has the same sequence number and block number as the record B1(1) is searched for. This is set as a record B1(2), and the subsequent records are set as records B2(2) and B2(3).

Thereafter, records Bm(3) and Bm(4) corresponding to the numbers of finishing 3 and 4 are searched for in a similar manner, and extraction ends when the search becomes impossible.

Next, a description will be given of the step of determining the abscissa.

As described above, the distances of movement in the blocks represented by the records Bm(n) do not necessarily agree with each other. Accordingly, an actual distance of movement from a leading position in each block is converted.

If it is assumed that the distance of movement LENG in the block is LENGm(1) in the case of rough machining and LENGm(n) in the case of finish machining, that the actual distance of movement from the leading position is Posm(n), and that the value used for the abscissa is PosYm(n), the abscissa distance PosY on the display means 11 is calculated as PosYm(n)=Posm(n)·(LENGm(1)/LENGm(n)).

As described above, as the actual distance of movement Posm(n) from the leading position is converted to the value PosYm(n) used for the abscissa, even if the actual distances of movement differ due to the offset value, it becomes possible to cause the respective distances of movement in the respective machining stages to substantially agree with each other.

A description will be given of the step of rendering abscissa data.

The data in FIG. 4 is read by taking as the abscissa the data converted in the above-described step of determining the abscissa and by taking as the ordinate the corresponding working voltage and the machining speed, and a two-dimensional graphic display is given as shown in FIG. 5. At this time, as information on the machining of different numbers of machining is displayed in a superposed manner on the same graph, it becomes possible to read the correlation between the machining stages, and it becomes possible to determine the number of machining which exerted a large influence or the number of machining up to which machining was satisfactory.

In giving the above-described display, as the method of effecting range designation for two-dimensional display, it is assumed that what is included in the rectangle is selected, but a starting point and a terminating point may be selected by directly pointing them on the simulation screen, or machining-state detection information data may be directly selected.

In addition, the directions in which machining paths of rough machining and finish machining are traced are assumed to be identical in all machining; however, in wire electrical discharge machining, there are cases where after rough machining is completed, the machining path of finish machining is traced in the opposite direction. In such a case, machining information of odd occasions is read in the forward direction. However, since it is possible to read machining information of even occasions in the backward direction, a plot can be made in the identical direction, and machining information at the same positions can be displayed on the two-dimensional graph while maintaining registry of the machining positions by the block numbers in the machining information. Therefore, the directions in which the machining paths are traced may not be identical.

In addition, although the distance of movement LENGm(1) of rough machining is used as the reference as the value used in the display of the abscissa, even if the distance of movement LENGm(n) of finish machining is used, the width of the overall graph only changes, and the correlation does not change. Further, if it is assumed that a virtual distance of movement without an offset is LENGm(0), an actual distance of movement PosY may be calculated and displayed by using this LENGm(0) as the reference.

Figure 6:
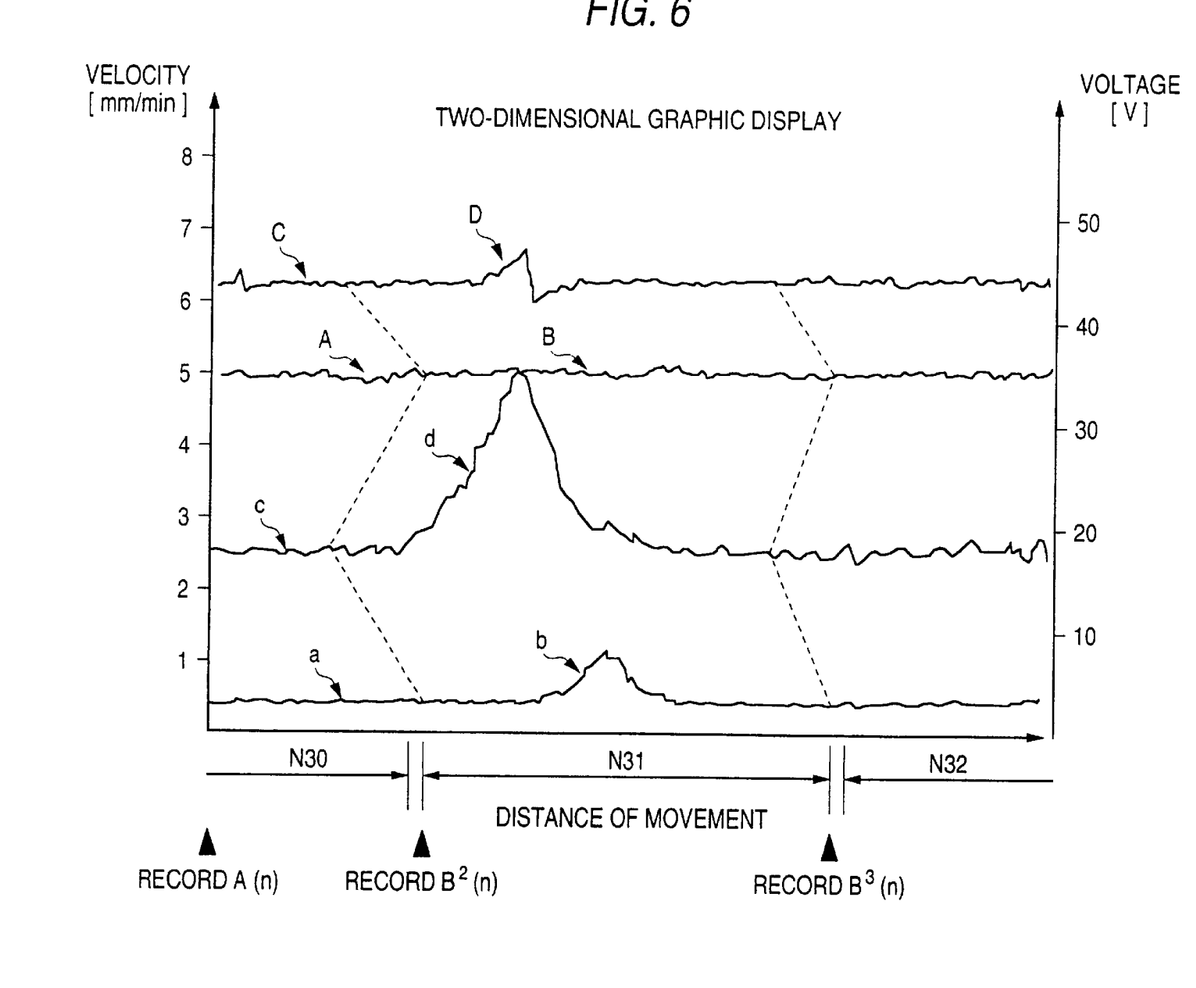
FIG. 6 is a diagram in which a display is given by connecting and correlating leading positions of the blocks without converting the distances of movement on the axis of abscissas.

In addition, the state of machining of a machined portion can be estimated by displaying the value of the distance of movement used in the abscissa as an actual distance of movement irrespective of the offset value and by connecting the leading ends of the blocks by a line.

INDUSTRIAL APPLICABILITY

As described above, the wire electrical discharge machine in accordance with the present invention is capable of detecting changes of the state of machining from rough machining to finish machining by correlating the changes to the positions in the machining program, so that the wire electrical discharge machine in accordance with the present invention facilitates improvement of the state of machining and can be used in highly efficient wire electrical discharge machining operations.

What is claimed is:

1. A numerical controller for a wire electrical discharge machine producing electrical discharge between a wire electrode and a workpiece and finishing the workpiece a plurality of times from rough machining to finish machining on the basis of a predetermined machining program, said numerical controller comprising:

machining controlling means for determining and controlling a machining speed of the wire electrode in accordance with a discharge gap between the workpiece and the wire electrode or a state of electrical discharge;

machining-state detecting means for detecting machining-state detection information including a working voltage for each movement of a predetermined distance in a process of execution of machining based on the machining program;

information-record storing means for correlating the machining-state detection information detected by said machining-state detecting means, the machining speed generated by said machining controlling means, and machining position information for each movement of the predetermined distance, and for storing them in a storage device as machining-state detection information records;

information-record reading means for reading the stored machining-state detection information records from said storage device; and two-dimensional graph displaying means for giving a graphic display by using the machining-state detection information and the machining speed, which are the machining-state detection information records thus read, as elements of one of two axes of a two-dimensional graph and by using the machining position information of the machining program as an element of the other axis thereof.

2. The numerical controller for a wire electrical discharge machine according to claim 1, wherein the machining position information is displayed by being correlated to blocks of the machining program.

3. A numerical controller for a wire electrical discharge machine producing electrical discharge between a wire electrode and a workpiece and machining the workpiece on the basis of a predetermined machining program, said numerical controller comprising:

machining controlling means for determining and controlling a machining speed in accordance with a discharge gap between the workpiece and the wire electrode or a state of electrical discharge;

machining-state detecting means for detecting machining-state detection information including a working voltage for each movement of a predetermined distance in a process of execution of machining based on the machining program;

information-record storing means for correlating detection information detected by said machining-state detecting means, the machining speed generated by said machining controlling means, machining position information for each movement of the predetermined distance, and at least one of a sequence number, a block number, a machining start hole number, and a number of finishing which are included in the machining program, and for storing them in a storage device as machining-state detection information records;

information-record reading means for reading the stored machining-state detection information records from said storage device; and two-dimensional graph displaying means for giving a graphic display by using the machining-state detection information and the machining speed, which are the machining-state detection information records thus read, as elements of one of two axes of a two-dimensional graph and by using the machining position information of the machining program as an element of the other axis thereof.

4. The numerical controller for a wire electrical discharge machine according to claim 3, wherein the machining position information is displayed by being correlated to blocks of the machining program.

* * * * *